United States Patent Office 3,366,572
Patented Jan. 30, 1968

3,366,572
OXIDATION OF CHEMILUMINESCENT SUBSTANCES
John M. W. Scott, St. Johns, Newfoundland, Canada, and Ronald F. Phillips, Bronxville, N.Y., assignors to American Cyanamid Company, Stamford, Conn., a corporation of Maine
No Drawing. Filed Mar. 9, 1965, Ser. No. 438,394
18 Claims. (Cl. 252—188.3)

ABSTRACT OF THE DISCLOSURE

Chemiluminescent compositions comprising (1) a chemiluminescent phthalhydrazide, (2) a persulfate, (3) a hydrogen peroxide compound, and (4) an alkaline reagent, and a method for providing chemiluminescent light by admixing these compounds.

---

The present invention relates to novel compositions of matter and a process for the direct generation of light from chemical energy. By "light," as referred to herein, is meant electromagnetic radiation at wavelengths falling between 350 m$\mu$ and 800 m$\mu$. The art of generating light from chemical energy, i.e., chemiluminescence, is continually in research of compositions which when reacted substantially improve the intensity and lifetime of light emissions. Obviously, improved compositions are constantly in demand for use as signal devices, for area illumination, etc.

The present invention is concerned with a composition which has not only chemiluminescent properties but which has inherent fluorescent properties, thereby eliminating the necessity of the addition of a separate fluorescent compound.

It is an object of this invention to obtain a chemiluminescent composition and a process employing said composition whereby high efficiency may be obtained in the conversion of chemical energy into light.

Another object is to obtain a chemiluminescent compound which produces light over an extended period of time.

Another object of this invention is to obtain a chemiluminescent composition which produces a light of substantially higher intensity than has been obtained by former chemiluminescent compositions.

Another object of this invention is to obtain a chemiluminescent composition which may be employed to produce light in a process which is mechanically simple and which is economically inexpensive.

Another object of this invention is to obtain a chemiluminescent reactant which is stable over a long period of time and which may be subsequently reacted to obtain chemiluminescent light.

Another object of this invention is to obtain a chemiluminescent reactant which when reacted will obtain chemiluminescent light by a process which is not hazardous.

Another object of this invention is to obtain a chemiluminescent reactant which when employed in the presence of other fluorescent agents will emit light of a desired color (dependent upon wavelenghth).

Another object of this invention is to obtain a reaction composition which includes the chemiluminescent reactant of this invention, a peroxide compound and a persulfate.

Another object of this invention is to obtain the reaction product of the chemiluminescent reactant of this invention when reacted with other necessary ingredients to produce chemiluminescent light.

Other objects become apparent from the disclosure herein.

The term "chemiluminescent reactant," as used herein, means a mixture which will result in a chemiluminescent reaction when reacted with other necessary reactants in the processes as disclosed herein.

The term "reactant" means "component(s)" of the composition of this invention.

The term "chemiluminescent composition," as used herein, means a mixture which produces chemiluminescence.

The term "admixing," as used herein, means "reacting" or sufficiently bringing together component reactants to obtain a chemiluminescent reaction.

The term "peroxidic group," as used herein, represents "HOO—."

The term "hydrogen peroxide compound" includes (1) hydrogen peroxide and (2) hydrogen peroxide-producing compounds.

The "light intensity" is measured by the method of Example B.

The term "fluorescent compound," as used herein means (1) a compound which is a fluorescer and/or (2) a compound which upon reaction produces a fluorescent compound.

The term "diluent," as used herein, means a solvent or a vehicle which when employed with a solvent does not cause insolubility.

The term "solid," as used herein, refers to a state in which the material is in the absence of a solvent such as water, and the material may be virtually in the form of a single solid state, or of lumps, or of ground or crushed particles, or of a powdery material.

The term "half-life" means the time required for the chemiluminescent light intensity to decrease to a point which is one-half the maximum intensity of light produced.

We have unexpectedly discovered that the objects of this invention are obtained by admixing reactants comprising (1) a chemiluminescent phthalhydrazide, (2) a persulfate, (3) a hydrogen peroxide compound, and (4) a base (an alkaline reagent), components of said composition being present in the ratios of components relative to said phthalhydrazide, ranging from about 0.833/1 to about 120/1 of said persulfate to said phthalhydrazide, from about 0.833/1 to about 100/1 of said hydrogen peroxide compound to said phthalhydrazide, and ranging from about 0.66/1 to about 100/1 of said base to said phthalhydrazide, and (5) a solvent, said solvent being admixed in an amount sufficient to provide from about $1 \times 10^{-3}$ moles to about $12 \times 10^{-3}$ moles of said phthalhydrazide per liter of said solvent and sufficient to provide at least about $1 \times 10^{-2}$ moles of said hydrogen peroxide per liter of said solvent.

Light emission from aqueous alkaline mixtures of 3-aminophthalhydrazide, hydrogen peroxide, and sodium persulfate has been described by A. Steigman ["Chemistry and Industry," 61, 36 (1942)]. Such mixtures were used at very low hydrogen peroxide concentrations as a method of detecting hydrogen peroxide. A typical hydrogen peroxide concentration cited in the reference is 0.2 microgram of hydrogen peroxide in 8.77 cc. of water, which is a concentration of about $7 \times 10^{-7}$ moles of peroxide per liter of water. This is the order of magnitude of peroxide concentration with which A. Steigman was concerned, which amount is less than one-thousandth of the minimum concentration of peroxide employed in this invention. Under such conditions the half-life time of light emission is on the order of 1 to 3 minutes or less, and the light level is too low for illuminating purposes. Moreover, Steigman's procedure calls for making a separate solution of 3-aminophthalhydrazide in aqueous ammonia, which must be stored until the time for use. Such solutions deteriorate in storage and become even more unsuitable for practical lighting.

The novel system of this invention includes (1) a storage-stable solid system (2) which provides bright light for (3) extended periods, by merely admixing the solid with water and/or other solvent. Storage stability is achieved by the use of the solid, dry components. Long lifetime of light emission is obtained by the use of sufficient peroxide to provide at least about $1 \times 10^{-2}$ moles of peroxide per liter of aqueous solution or solvent, when used in conjunction with up to a maximum persulfate concentration of $2.4 \times 10^{-1}$ moles per 55.5 moles of water, i.e., a maximum of $2.4 \times 10^{-1}$ moles of persulfate per liter of water. The peroxide-persulfate combination is unique in its ability to provide long lived luminescence. Other peroxide-oxidant combinations used heretofore (ferri cyanide, hypochlorite, permanganate, etc.) accommodate only short lifetimes of light emission. (See F. H. Stross, G. E. Branch, "J. Organic Chemistry," 3, 385 (1938); T. Bremer, "Bull. Soc. Chim. Belges," 62, 569 (1953).) As stated above, peroxide concentrations of $1 \times 10^{-2}$ moles or more are required with persulfate to produce the optimum long lifetime required for practical use.

The Steigman produced chemiluminescent light would conceivably never have exceeded an intensity of about $8.0 \times 10^{-2}$ footlamberts when measured in the absence of a fluorescer, or of about $4.8 \times 10^{-1}$ footlamberts when measured in the presence of disodium fluorescein, and the chemiluminescent light produced by Steigman would reasonably be less than about 2 minutes half-life duration under more favorable conditions, and at most would reasonably always be for less than 3 minutes half-life duration.

The duration of chemiluminescent light produced by this invention exceeds about 3 minutes half-life duration, normally lasting for from about 10 minutes to about 100 minutes or more, and concurrently the chemiluminescent light intensity may vary from a minimum of about $4.6 \times 10^{-2}$ footlamberts, where the lifetime may exceed 3 hours, up to about $4.5 \times 10^{-1}$ footlamberts or more, when measured in the absence of a fluorescer, or a minimum of about $2.63 \times 10^{-1}$ footlamberts up to about $30.0 \times 10^{-1}$ footlamberts or more, when measured in the presence of disodium fluorescein. The duration normally exceeds about 25 minutes.

In the practice of this invention, there are essential ingredients which are necessary to obtain a chemiluminescent reaction, and of these essential components, there are certain compositions which may be admixed prior to the final addition of the last component necessary to initiate the chemiluminescent reaction. Although in theory it is possible that water enters directly into the chemiluminescent reaction, there is no conclusive evidence to this effect. However, to obtain a chemiluminescent reaction, it is necessary that the other necessary ingredients all be present in the form of a solution brought about by admixing the ingredients with a solvent which inherently will dissolve each and every one of the other necessary ingredients. Thus, it is believed that any solvent which meets these requirements can be employed. However, the solvent primarily contemplated for purposes of this invention is water, alone or admixture with other solvents which, for example, may individually be less satisfactory than water.

Thus, the essential ingredients of this invention to obtain a chemiluminescent reaction are (1) a chemiluminescent phthalhydrazide, (2) a persulfate, (3) a hydrogen peroxide compound, (4) a base, and (5) a solvent capable of dissolving each and every one of the other essential ingredients. Additionally, as stated above, to obtain the chemiluminescent reaction of this invention, (1) the essential ingredients must be present in a particular ratio to the amount of phthalhydrazide present, and (2) the hydrogen peroxide compound, and the phthalhydrazide must each be present in an amount at least above a specific minimum.

The essential ingredients and the optional fluorescer are discussed at length above, in regard to the amount which must be present. It should be noted, however, that when the phthalhydrazide compound is present in at least the minimal amount, and when the other components are present within the ratios discussed above, each of the ingredients are present normally in the following approximate concentrations.

The base (alkali) is present in an amount sufficient to obtain a pH ranging from about pH 9.5 to about 12.5, as discussed above, preferably about pH 10 to about pH 12. Typically, when a carbonate is employed, the concentration will be about $2 \times 10^{-2}$ up to about $2 \times 10^{-1}$ molar. The intensity of light emission is influenced by the pH and is depressed as the reaction mixture becomes more acidic than pH 8 or more basic than pH 12.

The hydrogen peroxide compound will normally range from about $1 \times 10^{-2}$ molar up to about $5 \times 10^{-1}$ molar, preferably from about $3 \times 10^{-2}$ molar up to about $1 \times 10^{-1}$ molar.

The persulfate normally will range in approximate concentration of from about $5 \times 10^{-3}$ molar up to about $5 \times 10^{-1}$ molar, preferably $1 \times 10^{-2}$ molar to about $1.5 \times 10^{-1}$ molar.

The persulfate concentration determines the useful lifetime (i.e., the duration of the chemiluminescent reaction), so long as the peroxide is present in an amount of at least about $1 \times 10^{-2}$ moles per liter of water, and so long as the solution is within the pH range stated above.

The optional fluorescer compound normally varies within the approximate range of from about $1 \times 10^{-4}$ molar up to about $1 \times 10^{-2}$ molar, preferably $7 \times 10^{-4}$ molar up to about $3 \times 10^{-3}$.

As stated above, the solvent, preferably water, must be present in an amount sufficient to provide from about $1 \times 10^{-3}$ moles to about $12 \times 10^{-3}$ moles of phthalhydrazide per liter of solvent (preferably water) and to provide at least $1 \times 10^{-2}$ moles of hydrogen peroxide per liter of solvent (preferably water).

For each of the essential ingredients, there are a number of compounds which are within the scope of the invention as equivalents, although some may be preferred over the others.

Equivalent chemiluminescent phthalhydrazide compounds for purposes of this invention include compounds such as 3-aminophthalhydrazide, 4-aminophthalhydrazide, 3-dimethylaminophthalhydrazide, 4-diethylaminophthalhydrazide, 3-amino-5,6-dimethylphthalhydrazide, 3-amino-4-5,6-trimethoxyphthalhydrazide, and 3-hydroxyphthalhydrazide. Other typical phthalhydrazides are described in "Bull. Soc. Chim. France," A. Bernanose, 567 (1950).

Typical persulfate compounds for purposes of this invention include persulfates such as $K_2S_2O_8$, $Na_2S_2O_8$, $Li_2S_2O_8$, $(NH_4)_2S_2O_8$, $[(CH_3)_4N]_2S_2O_8$, and the like.

The peroxide employed in the composition and processes of this invention may be obtained from a suitable hydrogen peroxide-producing compound. For example, sodium perborate may be placed in aqueous solution whereby a solution of hydrogen peroxide is obtained. Obviously hydrogen peroxide solution may be employed. Although the presence of solvent, preferably water, capable of dissolving all components of the composition is necessary in order to obtain the chemiluminescence of this invention, the peroxide employed may be obtained from solid-form, anhydrous hydrogen peroxide compounds such as sodium perborate, sodium carbonate peroxide, perhydrate of urea (urea peroxide), perhydrate of pyrophosphate (sodium and potassium pyrophosphate peroxide), perhydrate of histidine (histidine peroxide), melamine peroxide, and the like. Any compound is employable which when dissolved in water will provide hydrogen peroxide. See, for example, "Hydrogen Peroxide," Reinhold Publishing Corporation, 1955, by W. C. Schumb et al., page 643. Still another form in which the anhydrous $H_2O_2$ may be provided in the composition is that of an anhydrous solution of $H_2O_2$ in a suitable solvent, such as an ether, an ester, alcohol, ketone, etc., of the type which would provide a suitable diluent for the composition of this invention.

The aqueous reactant or other solvent must be present in an amount such that the phthalhydrazide is present in the concentration discussed above, and such that the base obtains a pH of at least above about pH 8 up to about pH 13, in order to produce chemiluminescent light, preferably between about pH 9.5 and about pH 12. Any alkali is suitable, such as calcium carbonate or hydroxide, sodium carbonate or hydroxide, potassium carbonate or hydroxide, ammonium hydroxide, tetrabutylammonium hydroxide, a potassium phosphate or biphosphate, a sodium salt of alanine, a potassium salt of glycine, a nicotine, a quinine, a piperazine, and the like.

Reducing-bases such as sodium sulfide or the sodium salt of hydroquinone must be avoided since they reduce the efficiency of the light emission process. Likewise colored-bases such as the sodium salt of phenolphthalein must be avoided because of light absorption.

An optional but very desirable component is a water-soluble fluorescent dye having an absorption band at about 410 m$\mu$ or higher. Such dyes are described by Peter Pringsheim, Interscience Publishers Inc., New York, N.Y., 1949. Typical dyes include such compositions as fluorescein, rhodamine B and 6G, safranin-O, resorufin, leosin, and riboflavin, and water-soluble salts thereof, for example. The fluorescent compounds contemplated herein for the purposes of shifting the spectral emission to longer wavelengths are numerous and they may be defined broadly as those which do not readily react on contact with the peroxide employed. Typical suitable fluorescent compounds for use in the present invention are those which have a spectral emission falling between about 430 millimicrons and 800 millimicrons and which are at least partially soluble in any of the above diluents, if such diluent is employed. Typical substituents for all of these are phenyl, lower alkyl, chlorine, bromine, cyano, alkoxy ($C_1$–$C_{16}$), and other like substituents which do not interfere with the light-generating reaction contemplated herein. The fluorescent dye may be present in an amount ranging from about zero up to an amount of 10 parts of fluorescer to 1 part of the phthalhydrazide compound.

An additional optional ingredient is a chelating agent, which may vary from zero amount up to an amount of 10 parts of chelating agent to about 1 part of the phthalhydrazide compound. Any conventional chelating agent may be employed, a typical example being the sodium salt of ethylenediaminetetraacetic acid.

The water contemplated in the application of this invention can be obtained from any conventional source. Where the water may be contaminated with heavy metal ions such as iron, copper, cobalt, etc., it is desirable to include a chelating agent such as a salt of ethylenediaminetetraacetic acid to tie-up the heavy metal ions and thereby prevent undesirable side reactions which tend to unduly increase the rate of chemiluminescent reactions. When a chelating agent is employed, the normal molar concentration would range from about $2 \times 10^{-5}$ to about $10 \times 10^{-1}$, preferably from $3 \times 15^{-4}$ to about $8 \times 10^{-2}$, per liter of aqueous solvent employed in the chemiluminescent solution.

Water is preferably employed as the diluent. However, typical additional diluents which may be employed with the water as a supplemental diluent within the purview of the instant discovery are those that do not readily react with a peroxide such as those discussed above, for example, hydrogen peroxide, and which do not readily react with the base reactant of this invention. However, also compounds which upon decomposition during the admixing stage produce water or an alkali are within the scope of the invention.

The additional diluents (solvents) which may be employed may be any diluent if it is non-reactive with the peroxide employed so long as the peroxide employed is at least partially soluble in the diluent.

The chemiluminescent composition of this invention which obtains chemiluminescent light emission upon the admixing of the ingredients of the composition, may be admixed in a single stage of admixing or in a sequence of steps of admixing the separate ingredients. Accordingly, alternative compositions may be prepared which may be stored over a period of time and which may be admixed with the final ingredient at a time when the chemiluminescent lighting is desired. For example, one such composition would be a solid composition which is not in solution and which includes the fluorescer-producing phthalhydrazide compound and a persulfate, but which does not include a hydrogen peroxide composition and does not include a diluent. Another example would be a solid composition which includes the phthalhydrazide compound, a fluorescent compound, and a solid hydrogen peroxide-producing composition, but which does not include a diluent. An alternative composition would be a solid composition which includes the phthalhydrazide compound, a fluorescent compound, a persulfate, and which may or may not include a peroxide compound. Another alternative composition would be a composition which includes all of the essential components except the fluorescent compound. Another alternative composition would be a composition which includes the fluorescent compound, a peroxide and water, but which does not include the phthalhydrazide compound. Obviously the preferred compositions which would be less than all necessary components to produce a chemiluminescent light, would be a composition which would be substantially stable to a practical degree over an extended period of time; otherwise there would be no real advantage in forming a chemiluminescent reactant to be employed in a subsequent chemiluminescent reaction.

The order of addition of a diluent (solvent) and of a peroxide or other reactant compound is normally not critical, except where the diluent includes water (or other solvent in which all other reactants are substantially soluble). For example, when water is added to reactants in the absence of a peroxide compound, the phthalhydrazide and persulfate to produce a compound which normally will not react with a peroxide compound and which normally will not produce chemiluminescent light. Therefore, if water or other substantial solvent is added first to the composition, the peroxide or other absent reactants should be added reasonably soon thereafter to obtain optimum results. It is preferred to add and admix each of the reactants essential to chemiluminescence (1) before or (2) substantially simultaneously with the addition of water and/or other diluent. An alternative reactant combination would include a solution of a single reactant such as either the phthalhydrazide or the hydrogen peroxide to which the other essential reactants would be added or admixed when the chemiluminescent reaction is desired.

The wavelength of the light emitted by the composition of this invention will vary, depending upon the particular phthalhydrazide compound which is employed in the reaction mixture.

Temperature is not a critical factor but excellent results have been obtained at ambient temperature.

The mechanism of applicants' invention although not fully understood, is believed to be typically represented as follows.

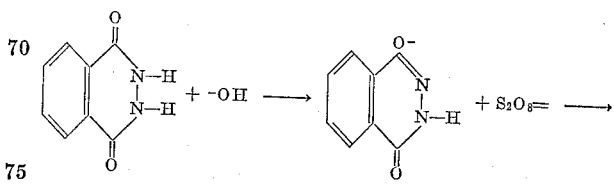

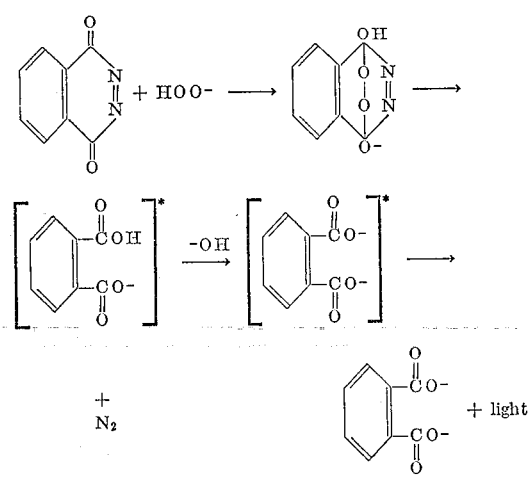

In this sequence, the last step is postulated as the light-producing step, where the intermediates in brackets correspond to the excited states.

The following examples are intended to illustrate the present invention and are in no way intended to limit the invention, except as limited in the appended claims.

*Example A*

(An experiment demonstrating that aqueous sodium 3-aminophthalhydrazide deteriorates.)

The initial intensity of the chemiluminescence obtained from a sodium luminol solution which had been aged ten (10) days before being reacted was found to be only 74% of that obtained from a freshly prepared solution of sodium luminol. Initial concentrations in both reactions were $1.0 \times 10^{-3}$ M in sodium luminol, $2.96 \times 10^{-2}$ M in $K_2S_2O_8$; $9.80 \times 10^{-1}$ N NaOH, and $2.66 \times 10^{-1}$ M in $H_2O_2$.

*Example B*

Example B is subdivided a series of Examples 1 through 15.

The Examples B–1 through B–15 in Table I are carried out by combining the components listed and by adding the mixture of components to one liter of water. A homogeneous solution is obtained. The intensity and lifetime measurements (duration) is made with a commercial brightness meter (Photoresearch Corporation, Hollywood, Calif., Model UB ½) on chemiluminescent solution contained in a cylindrical glass lamp of 55 mm. diameter which is silvered on the side away from the observer. The solid mixtures are stable for periods exceeding 4 months, provided they are stored in well-sealed containers, which would thereby exclude moisture.

Similar results are obtained when $K_2S_2O_8$ is replaced by other persulfates such as $Na_2S_2O_8$, and $Li_2S_2O_8$; $(NH_4)_2S_2O_8$ gives somewhat lower intensity. Similar results are obtained when $NaBO_3$ is replaced with other perhydrates such as $Na_4P_2O_7 \cdot H_2O_2$, $Na_2CO_3 \cdot H_2O_2$,

Similar results except for color are obtained when disodium fluorescein is employed by salts of losin (pink), rhodamine B (red), rhodamine 6G (red), resorufin (red), safranin-O (red), riboflavin (yellow). Similar results are obtained when potassium carbonate was replaced by sodium carbonate, ammonium carbonate, sodium hydroxide, dipotassium hydrogen phosphate, dipotassium phosphate, potassium pyrophosphate.

Similar results are obtained when 3-aminophthalhydrazide was replaced by other phthalhydrazides such as 4 - aminophthalhydrazide, 3-amino-6-methoxyphthalhydrazide, 3 - methylaminophthalhydrazide, 4 - dimethylaminophthalhydrazide, 3 - acetylaminophthalhydrazide, and phthalhydrazides with the structure below:

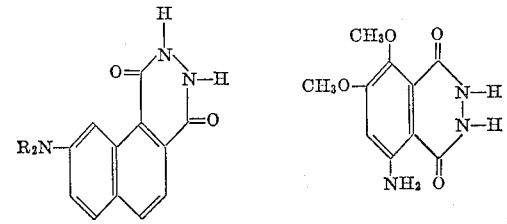

where R is selected from the group consisting of hydrogen, methyl, ethyl.

The data in the table demonstrate that:

(1) The light intensity increases with increasing concentrations of phthalhydrazide, persulfate, and peroxide (see Examples B1–3, 13 and 14 on hydrazide, B4–8 on persulfate and B9–13 on perborate).

(2) The lifetime of the reaction is patently dependent on the persulfate concentration with the lifetime increasing as the persulfate concentration decreases. (See Examples B4–8.)

(3) The intensity is substantially increased by disodium fluorescein, which also changes the color from blue to yellow. (See Examples B12 and 15.)

(4) At least about $5 \times 10^{-3}$ molar peroxide is required to provide long-lived luminescence. (See Examples B9–12.)

It is within the scope of this invention to make such modifications of the compositions and processes disclosed herein as would be obvious to a person of ordinary skill in this art, and it is to be understood that the examples il- TABLE I
[Experiments B-1 through B-15]

| Example | Sodium salt of 3-amino-phthalhydrazide | | $K_2S_2O_8$ | | $NaBO_3$ | | $K_2CO_3$ | | Disodium fluorescein | | Intensity and Lifetime when dissolved in one liter of water | | |
|---|---|---|---|---|---|---|---|---|---|---|---|---|---|
| | | | | | | | | | | | Maximum Intensity (foot-lamberts) | Half Life | |
| | Grams | Moles | Grams | Moles | Grams | Moles | Grams | Moles | Grams | Moles | | Min. | Color |
| 1 | 0.20 | $1 \times 10^{-3}$ | 16.2 | $6 \times 10^{-2}$ | 4.6 | $3 \times 10^{-2}$ | 2.76 | $2 \times 10^{-2}$ | 0.28 | $7.5 \times 10^{-4}$ | $2.78 \times 10^{-1}$ | 32 | Yellow. |
| 2 | 0.60 | $3 \times 10^{-3}$ | 16.2 | $6 \times 10^{-2}$ | 4.6 | $3 \times 10^{-2}$ | 2.76 | $2 \times 10^{-2}$ | 0.28 | $7.5 \times 10^{-4}$ | $7.02 \times 10^{-1}$ | 32 | Do. |
| 3 | 1.19 | $6 \times 10^{-3}$ | 16.2 | $6 \times 10^{-2}$ | 4.6 | $3 \times 10^{-3}$ | 2.76 | $2 \times 10^{-2}$ | 0.28 | $7.5 \times 10^{-4}$ | $10.02 \times 10^{-1}$ | 28 | Do. |
| 4 | 1.59 | $8 \times 10^{-3}$ | None | None | 9.2 | $6 \times 10^{-2}$ | 5.53 | $4 \times 10^{-2}$ | 0.28 | $7.5 \times 10^{-4}$ | None | | |
| 5 | 1.59 | $8 \times 10^{-3}$ | 2.7 | $1 \times 10^{-2}$ | 9.2 | $6 \times 10^{-2}$ | 5.53 | $4 \times 10^{-2}$ | 0.06 | $1.5 \times 10^{-3}$ | $2.63 \times 10^{-1}$ | 100 | Do. |
| 6 | 1.59 | $8 \times 10^{-3}$ | 8.1 | $3 \times 10^{-2}$ | 9.2 | $6 \times 10^{-2}$ | 5.53 | $4 \times 10^{-2}$ | 0.56 | $1.5 \times 10^{-3}$ | $7.42 \times 10^{-1}$ | 50 | Do. |
| 7 | 1.59 | $8 \times 10^{-3}$ | 16.2 | $6 \times 10^{-2}$ | 9.2 | $6 \times 10^{-2}$ | 5.53 | $4 \times 10^{-2}$ | 0.56 | $1.5 \times 10^{-3}$ | $15.78 \times 10^{-1}$ | 25 | Do. |
| 8 | 1.59 | $8 \times 10^{-3}$ | 32.4 | $12 \times 10^{-2}$ | 9.2 | $6 \times 10^{-2}$ | 5.53 | $4 \times 10^{-2}$ | 0.56 | $1.5 \times 10^{-3}$ | $20.42 \times 10^{-1}$ | 10 | Do. |
| 9 | 1.59 | $8 \times 10^{-3}$ | 16.2 | $6 \times 10^{-2}$ | None | None | 5.53 | $4 \times 10^{-2}$ | 0.56 | $1.5 \times 10^{-3}$ | $3.71 \times 10^{-1}$ | 1 | Do. |
| 10 | 1.59 | $8 \times 10^{-3}$ | 16.2 | $6 \times 10^{-2}$ | 0.15 | $1 \times 10^{-3}$ | 5.53 | $4 \times 10^{-2}$ | 0.56 | $1.5 \times 10^{-3}$ | $4.80 \times 10^{-1}$ | 2 | Do. |
| 11 | 1.59 | $8 \times 10^{-3}$ | 16.2 | $6 \times 10^{-2}$ | 1.5 | $1 \times 10^{-2}$ | 5.53 | $4 \times 10^{-2}$ | 0.56 | $1.5 \times 10^{-3}$ | $6.00 \times 10^{-1}$ | 20 | Do. |
| 12 | 1.59 | $8 \times 10^{-3}$ | 16.2 | $6 \times 10^{-2}$ | 4.6 | $3 \times 10^{-2}$ | 5.53 | $4 \times 10^{-2}$ | 0.56 | $1.5 \times 10^{-3}$ | $12.06 \times 10^{-1}$ | 28 | Do. |
| 13 | 1.59 | $8 \times 10^{-3}$ | 16.2 | $6 \times 10^{-2}$ | 9.2 | $6 \times 10^{-2}$ | 5.53 | $4 \times 10^{-2}$ | 0.56 | $1.5 \times 10^{-3}$ | $16.05 \times 10^{-1}$ | 25 | Do. |
| 14 | 2.39 | $12 \times 10^{-3}$ | 16.2 | $6 \times 10^{-2}$ | 9.2 | $6 \times 10^{-2}$ | 13.8 | $1 \times 10^{-1}$ | 2.26 | $6 \times 10^{-3}$ | $13.92 \times 10^{-1}$ | 25 | Do. |
| 15 | 1.59 | $8 \times 10^{-3}$ | 16.2 | $6 \times 10^{-2}$ | 9.2 | $6 \times 10^{-2}$ | 5.53 | $4 \times 10^{-2}$ | None | | $2.78 \times 10^{-1}$ | 25 | Blue. | lustrating this invention are intended to limit the invention only insofar as is stated in the specification and as the following claims are limited. Also, it is within the scope of this invention to form an apparatus such as a container or (1) insoluble or (2) dissolvable capsule in which the reactant of this invention is enclosed for subsequent reaction with the other ingredients necessary to produce chemiluminescent energy and light.

We claim:

1. A composition for producing chemiluminescence, said composition comprising (1) a chemiluminescent phthalhydrazide, (2) a persulfate, (3) a hydrogen peroxide compound, and (4) an alkaline reagent, components of said composition being present in the ratios of components relative to said phthalhydrazide, ranging from about 0.833/1 to about 120/1 of said persulfate to said phthalhydrazide, ranging from about 0.833/1 to about 100/1 of said hydrogen peroxide compound to said phthalhydrazide, and ranging from about 0.66/1 to 100/1 of said alkaline reagent per phthalhydrazide.

2. A composition according to claim 1, including a fluorescer.

3. A composition according to claim 2, in which said fluorescer has an absorption band above about 410 m$\mu$.

4. A composition according to claim 1, including a chelating agent.

5. A composition according to claim 1, in which (a) said phthalhydrazide is employed in an amount ranging from about $4 \times 10^{-3}$ to about $1.2 \times 10^{-2}$ moles per liter of water, (b) said alkaline reagent is employed in an amount ranging from about $1 \times 10^{-3}$ to about $5 \times 10^{-1}$ moles per liter of water, (c) said hydrogen peroxide compound is employed in an amount ranging from about $1 \times 10^{-2}$ to about $2 \times 10^{-1}$ per liter of water, and (d) said persulfate is employed in an amount ranging from about $1 \times 10^{-2}$ to about $2.4 \times 10^{-1}$ moles per liter of water.

6. A composition for producing chemiluminescence, said composition comprising (1) a 3-aminophthalhydrazide, (2) a persulfate, (3) a perborate, and (4) an alkaline reagent, components of said composition being present in the ratios of components relative to said 3-aminophthalhydrazide, ranging from about 0.833/1 to about 120/1 of said persulfate to said 3-aminophthalhydrazide, ranging from about 0.833/1 to about 100/1 of said perborate to said 3-aminophthalhydrazide, and ranging from about 0.66/1 to 100/1 of said alkaline reagent per 3-aminophthalhydrazide.

7. A composition according to claim 6, in which said phthalhydrazide is present in an amount ranging from about $1 \times 10^{-3}$ moles to about $12 \times 10^{-3}$ moles of said phthalhydrazide per liter of water and in which said hydrogen peroxide is present in an amount of at least about $1 \times 10^{-2}$ moles of peroxide per liter of water.

8. A composition according to claim 6, including fluorescein.

9. A composition according to claim 7, including water in an amount sufficient to form a solution of said composition.

10. A solid composition for producing chemiluminescence, said composition comprising (1) a chemiluminescent phthalhydrazide, (2) a persulfate, (3) a substantially solid hydrogen peroxide compound, and (4) an alkaline reagent, components of said composition being present in the ratios of components relative to said phthalhydrazide, ranging from about 0.833/1 to about 120/1 of said persulfate to said phthalhydrazide, ranging from about 0.833/1 to about 100/1 of said solid hydrogen peroxide compound to said phthalhydrazide, and ranging from about 0.66/1 to 100/1 of said alkaline reagent per phthalhydrazide, said composition being in a substantially solid state.

11. A chemiluminescent composition comprising (1) a chemiluminescent phthalhydrazide, (2) a persulfate, (3) a hydrogen peroxide compound, (4) an alkaline reagent, components of said composition being present in the ratios of components relative to said phthalhydrazide, ranging from about 0.833/1 to about 120/1 of said persulfate to said phthalhydrazide, ranging from about 0.833/1 to about 100/1 of said hydrogen peroxide compound to said phthalhydrazide, and ranging from about 0.66/1 to 100/1 of said alkaline reagent per phthalhydrazide, said composition including (5) water in an amount sufficient to form a solution of said composition.

12. A composition according to claim 11, including a fluorescer.

13. A process for producing chemiluminescent light of an intensity of at least about $4.6 \times 10^{-2}$ footlamberts for a duration of at least about 3 minutes where said light intensity is measured on chemiluminescent solution contained in a cylindrical glass lamp of 55 mm. diameter and is silvered on the side away from a brightness meter employed, said process comprising admixing reactants comprising (1) a chemiluminescent phthalhydrazide, (2) a persulfate, (3) a hydrogen peroxide compound, (4) an alkaline reagent, components of said composition being present in the ratios of components relative to said phthalhydrazide, ranging from about 0.833/1 to about 120/1 of said persulfate to said phthalhydrazide from about 0.833/1 to about 100/1 of said hydrogen peroxide compound to said phthalhydrazide, and ranging from about 0.66/1 to about 100/1 of said alkaline reagent per phthalhydrazide, and (5) a solvent, said solvent being admixed in an amount sufficient to provide from about $1 \times 10^{-3}$ moles to about $12 \times 10^{-3}$ moles of said phthalhydrazide per liter of said solvent and sufficient to provide at least about $1 \times 10^{-2}$ moles of said hydrogen peroxide per liter of said solvent.

14. A process according to claim 13, including a fluorescer.

15. A process for producing chemiluminescent light of an intensity of at least about $4.6 \times 10^{-2}$ footlamberts for a duration of at least about 3 minutes where said light intensity is measured on chemiluminescent solution contained in a cylindrical glass lamp of 55 mm. diameter and is silvered on the side away from a brightness meter employed, said process comprising admixing reactants comprising (1) a chemiluminescent phthalhydrazide, (2) a persulfate, (3) a hydrogen peroxide compound, (4) an alkaline reagent, components of said composition being present in the ratios of components relative to said phthalhydrazide, ranging from about 0.833/1 to about 120/1 of said persulfate to said phthalhydrazide, ranging from about 0.833/1 to about 100/1 of said hydrogen peroxide compound to said phthalhydrazide, and ranging from about 0.66/1 to about 100/1 of said alkaline reagent per phthalhydrazide, and (5) an aqueous medium, said aqueous medium being admixed in an amount sufficient to provide for from about $1 \times 10^{-3}$ moles to about $12 \times 10^{-3}$ moles of said phthalhydrazide per liter of water and sufficient to provide at least about $1 \times 10^{-2}$ moles of said hydrogen peroxide per liter of water.

16. A process for producing chemiluminescent light of an intensity of at least about $4.6 \times 10^{-2}$ footlamberts for a duration of at least about 3 minutes where said light intensity is measured on chemiluminescent solution contained in a cylindrical glass lamp of 55 mm. diameter and is silvered on the side away from a brightness meter employed, said process comprising admixing reactants comprising (1) a chemiluminescent phthalhydrazide, (2) a persulfate, (3) a hydrogen peroxide compound, (4) an alkaline reagent, components of said composition being present in the ratios of components relative to said phthalhydrazide, ranging from about 0.833/1 to about 120/1 of said persulfate to said phthalhydrazide, ranging from about 0.833/1 to about 100/1 of said solid hydrogen peroxide compound to said phthalhydrazide, and ranging from about 0.66/1 to 100/1 of said alkaline reagent per phthalhydrazide, and (5) an aqueous medium, said aqueous medium being admixed in an amount sufficient to provide for from about $1 \times 10^{-3}$ moles to about $12 \times 10^{-3}$ of solid phthalhydrazide per liter of water and sufficient to provide at least about $1 \times 10^{-2}$ moles of said hydrogen peroxide per liter of water, said reactants additionally including (6) a water-soluble fluorescer.

17. A process for producing chemiluminescent light of an intensity of at least about $4.6 \times 10^{-2}$ footlamberts for a duration of at least about 3 minutes where said light intensity is measured on chemiluminescent solution contained in a cylindrical glass lamp of 55 mm. diameter and is silvered on the side away from a brightness meter employed, said process comprising admixing reactants comprising (1) a chemiluminescent phthalhydrazide, (2) a persulfate, (3) a solid hydrogen peroxide compound, (4) an alkaline reagent, components of said composition being present in the ratios of components relative to said phthalhydrazide, ranging from about 0.833/1 to about 120/1 of said persulfate to said phthalhydrazide, ranging from about 0.833/1 to about 100/1 of said solid hydrogen peroxide compound to said phthalhydrazide, and ranging from about 0.66/1 to 100/1 of said alkaline reagent per phthalhydrazide, said composition being in a substantially solid state, and (5) an aqueous medium, said aqueous medium being admixed in an amount sufficient to provide for from about $1 \times 10^{-3}$ moles to about $12 \times 10^{-3}$ moles of said phthalhydrazide per liter of water and sufficient to provide at least about $1 \times 10^{-2}$ moles of said hydrogen peroxide per liter of water, said reactants including a chelating agent.

18. A process for producing chemiluminescent light comprising adding water to a solid chemiluminescent composition comprising (1) a chemiluminescent phthalhydrazide, (2) a persulfate, (3) a substantially solid hydrogen peroxide compound, and (4) an alkaline reagent, components of said composition being present in the ratios of components relative to said phthalhydrazide, ranging from about 0.833/1 to about 120/1 of said persulfate to said phthalhydrazide, ranging from about 0.833/1 to about 100/1 of said solid hydrogen peroxide compound to said phthalhydrazide, and ranging from about 0.66/1 to 100/1 of said alkaline reagent per phthalhydrazide.

References Cited

UNITED STATES PATENTS 2,420,286   5/1947   Lacey et al. _____ 252—188.3

LEON D. ROSDOL, *Primary Examiner.*

JOHN D. WELSH, *Assistant Examiner.*